US012234659B2

United States Patent
Fang et al.

(10) Patent No.: US 12,234,659 B2
(45) Date of Patent: Feb. 25, 2025

(54) TOWER SECTION AND WIND GENERATING SET

(71) Applicant: JIANGSU GOLDWIND SCIENCE & TECHNOLOGY CO., LTD., Jiangsu (CN)

(72) Inventors: Jing Fang, Jiangsu (CN); Zhu Zhang, Jiangsu (CN); Long Ma, Jiangsu (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 321 days.

(21) Appl. No.: 17/904,618

(22) PCT Filed: Oct. 10, 2020

(86) PCT No.: PCT/CN2020/120171
§ 371 (c)(1),
(2) Date: Aug. 19, 2022

(87) PCT Pub. No.: WO2021/164274
PCT Pub. Date: Aug. 26, 2021

(65) Prior Publication Data
US 2023/0109211 A1 Apr. 6, 2023

(30) Foreign Application Priority Data
Feb. 20, 2020 (CN) .......................... 202010103876.4

(51) Int. Cl.
*E04G 21/14* (2006.01)
*E04H 12/34* (2006.01)
(Continued)

(52) U.S. Cl.
CPC ........... *E04G 21/142* (2013.01); *F03D 13/10* (2016.05); *F03D 13/20* (2016.05); *E04H 12/342* (2013.01);
(Continued)

(58) Field of Classification Search
CPC ....... E04G 21/142; F03D 13/10; F03D 13/20; E04H 12/342; F05B 2230/61; F05B 2240/912; B66C 1/108; B66C 1/62
See application file for complete search history.

(56) References Cited

U.S. PATENT DOCUMENTS 6,135,695 A * 10/2000 Kindem .................... B66C 1/62
414/803
10,113,530 B2 * 10/2018 Neumann ............... F03D 13/40
(Continued)

FOREIGN PATENT DOCUMENTS

CN 202245667 U 5/2012
CN 202570754 U 12/2012
(Continued)

OTHER PUBLICATIONS

Translation of 208761976 (Year: 2019).*
(Continued)

*Primary Examiner* — Andrew J Triggs

(57) ABSTRACT

A tower section and a wind generating set. The tower section comprises a tower section body and hoisting lugs, wherein through holes are provided in the sidewall of the tower section body, and an inner cavity of the tower section is communicated with the outside by means of the through holes; the hoisting lugs are provided in the through holes, are movable along central lines of the through holes, and can move between a first position where the hoisting lugs extend out of the tower section body and a second position where the hoisting lugs are retracted to the tower section body, so as to hoist the tower section. Because the hoisting lugs can selectively extend out, a tower hoist is not needed to be connected to a flange in a tower section hoisting process, and the hoist is mounted on the hoisting lugs.

18 Claims, 5 Drawing Sheets

(51) Int. Cl.
  *F03D 13/10* (2016.01)
  *F03D 13/20* (2016.01)
(52) U.S. Cl.
  CPC ..... *F05B 2230/61* (2013.01); *F05B 2240/912* (2013.01)

(56) References Cited

U.S. PATENT DOCUMENTS

| | | | |
|---|---|---|---|
| 10,343,875 B2* | 7/2019 | Cortada Acosta | ........ F03D 9/25 |
| 2010/0139181 A1 | 6/2010 | Cortina-Cordero et al. | |
| 2016/0348650 A1* | 12/2016 | Moeller | .................. F03D 80/88 |
| 2020/0200148 A1 | 6/2020 | Extebanez et al. | |
| 2023/0109211 A1* | 4/2023 | Fang | ........................ F03D 13/10 52/125.6 |

FOREIGN PATENT DOCUMENTS

| | | | |
|---|---|---|---|
| CN | 106429783 A | | 2/2017 |
| CN | 206606610 U | | 11/2017 |
| CN | 207334098 U | | 5/2018 |
| CN | 208761976 U | * | 4/2019 |
| CN | 209470594 U | | 10/2019 |
| EP | 3 569 796 A1 | | 11/2019 |
| KR | 20130079676 A | | 7/2013 |
| WO | 2017/215718 A1 | | 12/2017 |
| WO | 2018/233786 A1 | | 12/2018 |

OTHER PUBLICATIONS

Australian Examination Report No. 1; dated Oct. 23, 2023; Appln. No. 2020430781.

The Extended European Search Report dated Oct. 11, 2023; Appln. No. 20920742.2.

The International Search Report mailed Dec. 28, 2020; PCT/CN2020/120171.

First Chilean Office Action dated Apr. 30, 2024; Appln. No. 202202253.

First Chinese Office Action dated Dec. 24, 2021; Appln. No. 202010103876.4.

* cited by examiner

TOWER SECTION AND WIND GENERATING SET

This application is a National Stage of International Application No. PCT/CN2020/120171, filed Oct. 10, 2020, which claims priority to and the benefit of Chinese Patent Application No. 202010103876.4, titled "TOWER SECTION AND WIND GENERATING SET," filed Feb. 20, 2020, the entireties of which are incorporated herein by reference.

FIELD

The present disclosure relates to the technical field of wind power generation, and in particular to a tower section and a wind generating set with the tower section.

BACKGROUND

With the development of wind power in deep-water seas, a load to which a unit is subjected gradually increases due to the influence of water depth. Compared with a northern sea, the load to the unit increases to nearly twice, and a structure of a wind generating set will increase correspondingly. However, the trend of offshore wind power grid parity is increasingly obvious. In order to reduce the cost, on the one hand, the structural form of the tower foundation is changed, and on the other hand, the tower structure is optimized.

At present, a tower diameter, a flange parameter, the number of bolt holes and a layout of an internal structure of a tower are all different in different farms. Different sizes of the tower need to be matched with different tower hoisting tools, for turning over and hoisting, for the matching of the bolt holes, for the switching of hoisting the towers with different diameters, for the eccentricity of the center of gravity inside the tower, and so on. Therefore, a large number of tower hoisting tools of different models need to be manufactured.

Therefore, how to improve the versatility of tower hoisting tools to reduce costs is an urgent technical problem in this field.

SUMMARY

An object according to the present disclosure is to provide a tower section, through holes for hoisting lugs to move back and forth are provided in a side wall of the tower section, and the hoisting lugs can selectively extend out of the tower section for hoisting.

Since the hoisting lugs of the tower section can selectively extend out, in a wind generating set provided according to the present disclosure, it does not need to manufacture and use a special tower hoisting tool, which can reduce the cost.

For the objects described above, the following technical solutions are provided according to the present disclosure.

According to an aspect of the present disclosure, a tower section is provided, which includes a tower section body and hoisting lugs, through holes are provided in a side wall of the tower section body, and an inner cavity of the tower section is in communication with an exterior through the through holes; the hoisting lugs are arranged in the through holes, are movable along central lines of the through holes, and are movable between a first position extending out of the tower section body and a second position retracting into the tower section body, to hoist the tower section. Since the hoisting lugs can selectively extend out, a tower hoisting tool is not needed to be connected to a flange during the hoisting of the tower section, and the hoisting tool is mounted on the hoisting lugs, which does not need to manufacture and use a dedicated tower hoisting tool, thereby reducing costs. Furthermore, since the tower hoisting tool is not needed to be fixedly connected to the flange, the assembly and disassembly time of the tower hoisting tool is saved, and the working efficiency is improved.

Specifically, at least two hoisting lugs are provided, each hoisting lug includes a main body portion, which is located in the tower section body, and a extending-out portion, which extends out of the tower section body, a bearing is sleeved on an outer circumference of the extending-out portion, and an outer ring of the bearing rotates around a central axis of the hoisting lug, which meets the needs of rotation during the hoisting of the tower section, avoids the sliding friction between the sling and the hoisting lug, and thus improves the service life of the sling.

As another embodiment of the present disclosure, each hoisting lug has a stepped shaft structure, a diameter of the main body portion is greater than a diameter of the extending-out portion, and a projection of the main body portion in a direction perpendicular to the central axis of the hoisting lug covers a projection of the outer ring of the bearing in the direction perpendicular to the central axis of the hoisting lug.

As another embodiment of the present disclosure, the tower section further includes an end cover, which is connected to an end of the extending-out portion away from an end of the main body portion, and a projection of the end cover in the direction perpendicular to the central axis of the hoisting lug extends outward from a projection of the bearing in the direction perpendicular to the central axis of the hoisting lug. More specifically, the end cover and the hoisting lug have a same shape in the direction perpendicular to the central axis of the hoisting lug, and a cross section of the hoisting lug in the direction is greater than a cross section of the end cover in the direction, so that the end cover closely covers the through hole in a case that the extending-out portion of the hoisting lug retracts into the through hole, so as to prevent external salt mist and water vapor from entering the tower during the operation of the wind generating set. In another aspect, the end cover can limit the sling wound around an outer circumference of the extending-out portion in a case that the extending-out portion of the hoisting lug extends out of the through hole, so as to prevent the sling from falling off from the end cover, thereby further improving the safety. More preferably, the cross section of the end cover in the direction perpendicular to the central axis of the hoisting lug is circular.

As another embodiment of the present disclosure, a sealing member is provided between the end cover and the hoisting lug, and the sealing member is retracted into the through hole for sealing in the case that the extending-out portion of the hoisting lug retracts into the through hole, which further improves the sealing performance of the tower section.

As another embodiment of the present disclosure, the tower section is cylindrical, the central axis of each hoisting lug extends along a radial direction of the tower section, and at least two hoisting lugs are spaced apart at a predetermined angle along a circumferential direction of the tower section.

As another embodiment of the present disclosure, at least two hoisting lugs are provided along an axial direction of the tower section body, and at least two hoisting lugs are spaced apart at the predetermined angle along a circumferential direction of the tower section body at which each hoisting lug is located, so as to facilitate the horizontal hoisting of the tower section.

Furthermore, the tower section further includes a guiding member which is coaxially arranged with the through hole, the guiding member is fixed to the tower section body, a guiding groove is provided in one of an inner wall of the guiding member and an outer circumference of the hoisting lug, a sliding block which is matched with the guiding groove is provided in the other one of the inner wall of the guiding member and the outer circumference of the hoisting lug, and the sliding block is slidable in the guiding groove.

According to another exemplary embodiment of the present disclosure, a limiting block is formed at an end of the main body portion away from the extending-out portion, and the limiting block is formed by protruding outward from an outer circumference of the main body portion, so as to be capable of being clamped at an end of the guiding member.

According to another embodiment of the present disclosure, the tower section further includes a spring locking pin, which is pre-embedded in one of the outer circumference of the main body portion and an inner cavity of the guiding member, a groove, which is matched with the spring locking pin, is provided in the other one of the outer circumference of the main body portion and the inner cavity of the guiding member, and the spring locking pin is selectively fixed in the groove.

Furthermore, the tower section further includes a supporting platform, which is fixed to an inner chamber of the tower section, the guiding member is fixed to the supporting platform, a driving member is a hydraulic cylinder, one of a cylinder body and a cylinder rod of the hydraulic cylinder is connected to the hoisting lug, and the other one of the cylinder body and the cylinder rod of the hydraulic cylinder is connected to the supporting platform, the hydraulic cylinder is connected to the main body portion to drive the hoisting lug to move into the through hole, so that the extending-out portion can selectively extend out of the tower section for hoisting.

According to another aspect of the present disclosure, a wind generating set is provided, which includes the tower section provided according to the present disclosure.

The tower section and the wind generating set provided according to the present disclosure have at least the following beneficial effects: the tower section provided according to the present disclosure includes the hoisting lug that is movable along a direction of a centerline of the through hole of the tower section body, and a second end of the hoisting lug can extend out of the tower section for hoisting in a case that the tower section needs to be hoisted. Due to the existence of the hoisting lug, there is no need to manufacture and use a dedicated tower hoisting tool, thereby reducing the cost.

BRIEF DESCRIPTION OF THE DRAWINGS

The above and other objects and features of the present disclosure will become clearer through the following description of the embodiments in conjunction with the drawings.

REFERENCE NUMERALS IN THE DRAWINGS

Figure 1:
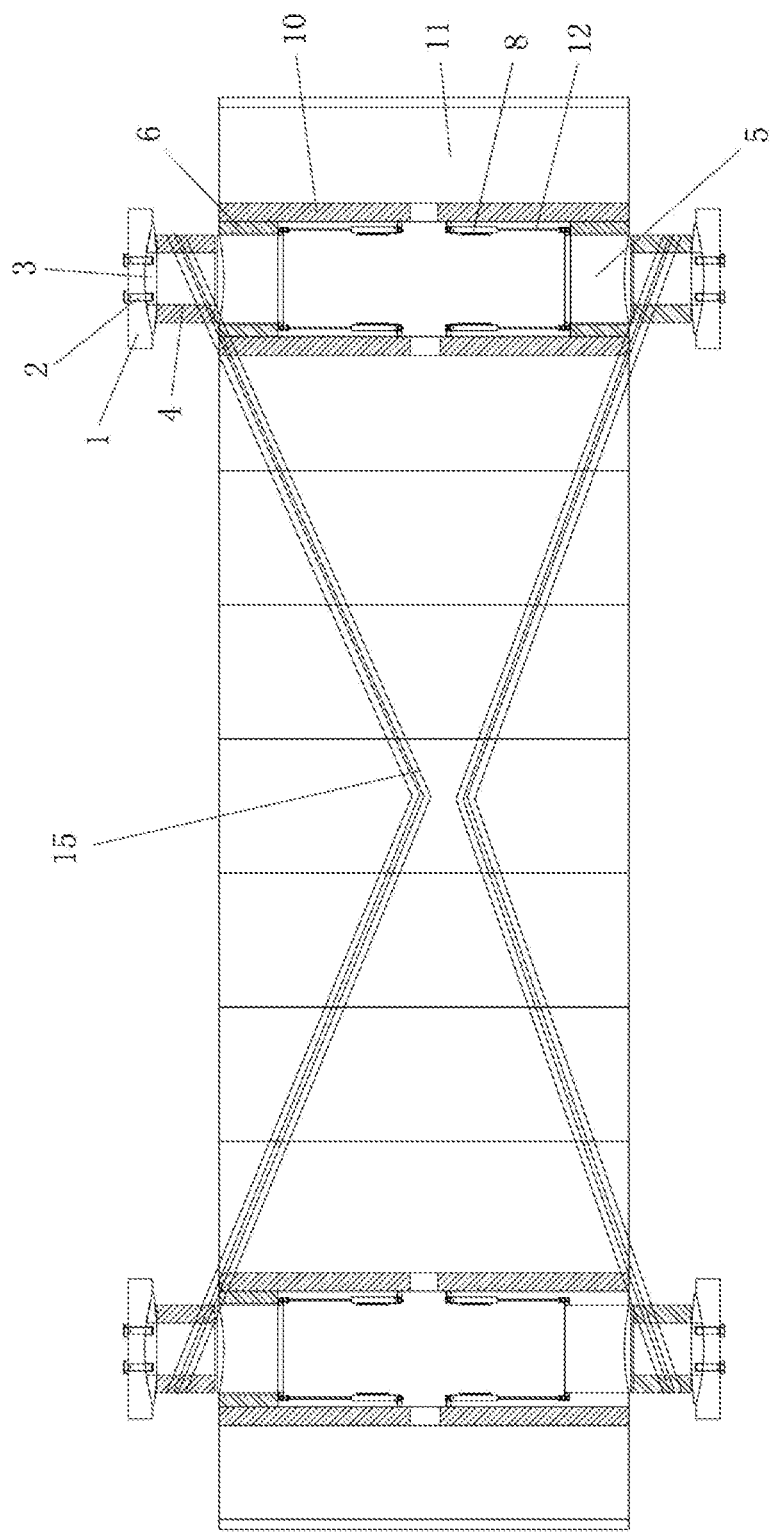
FIG. 1 is structural view of a tower section in a hoisting state according to a specific embodiment of the present disclosure.

1: end cover;
2: fastener;
3: sealing member;
4, bearing;
5: hoisting lug;
6: guiding member;
7: first mounting seat;
8: cylinder body;
9: second mounting seat;
10: supporting platform;
11: tower section body;
12: cylinder rod;
13: hoisting beam assembly;
15: sling;
16: wind cable;
17: threaded hole.

DETAILED DESCRIPTION OF THE EMBODIMENTS

Exemplary implementations are now described more comprehensively with reference to the accompanying drawings. However, the examples of implementations may be implemented in multiple forms, and it is not to be understood as being limited to the embodiments described herein. Conversely, the implementations are provided to make the present application more comprehensive and complete, and comprehensively convey the idea of the examples of the implementations to a person skilled in the art. The same reference numerals in the drawings denote the same or similar structures, and thus their detailed descriptions will be omitted.

A wind generating set includes a tower, a wind generator, which is supported on a top of the tower, a wind wheel and other components. The tower includes multiple tower sections which are stacked from top to bottom, and a specific structure of the tower section is described below.

Referring to FIGS. 1 to 7, in an exemplary embodiment of the tower section according to the present disclosure, the tower section includes a tower section body 11, at least two hoisting lugs 5 and a driving member. Through holes are provided in a side wall of the tower section body 11, and an inner cavity of the tower section body 11 is in communication with an exterior through the through holes. The hoisting lugs 5 can be arranged in the through holes, and be movable along directions of centerlines of the through holes. The driving member can be arranged in the inner cavity of the tower section body 11, and the driving member can be connected to the hoisting lug 5 to drive the hoisting lug 5 to move back and forth between a first position and a second position, where a part of the hoisting lug 5 extends out of the tower section body 11 for hoisting in a case that the hoisting lug 5 is in the first position, and the hoisting lug 5 retracts into the through hole of the tower section body 11 in a case that the hoisting lug 5 is in the second position.

The hoisting lug 5 of the tower section according to the present disclosure can selectively extend out of the tower section body 11 as needed. For example, a part of the hoisting lug 5 can extend out of the tower section body 11 in a case that the tower section needs to be hoisted, so as to facilitate of being connected to a sling 15. Due to the existence of the hoisting lugs 5, it does not need a flange bolt of the tower in order to connect the tower section to a tower hoisting tool, which simplifies the mounting process of the tower hoisting tool and improves the work efficiency. In another aspect, the tower section does not need to be matched with a special tower hoisting tool, which reduces the cost.

Referring to the figures, the tower section provided according to the present disclosure includes two hoisting lugs 5, but is not limited thereto. Those skilled in the art can select the number of the hoisting lugs 5 as needed.

Each hoisting lug 5 includes a main body portion, which is located in the tower section body 11, and an extending-out portion, which is connected to the main body portion and is able to extend out of the tower section body 11, a bearing 4 is sleeved on an outer circumference of the extending-out portion, and an outer ring 4a of the bearing 4 is rotatable around a central axis of the hoisting lug 5, which meets the needs of rotation during hoisting of the tower section, avoids the sliding friction between the sling 15 and the hoisting lug 5, and thus improves the service life of the sling 15. A separate driving member can be provided to drive the bearing to rotate. Of course, the bearing 4 may not be provided on the outer circumference of the extending-out portion, which is also within the protection scope of the present disclosure.

As another embodiment of the present disclosure, each hoisting lug 5 has a stepped shaft structure, an area of a cross section of the main body portion is greater than an area of a cross section of the extending-out portion, and a projection of the main body portion in a direction perpendicular to the central axis of the hoisting lug covers a projection of the outer ring 4a of the bearing 4 in the direction perpendicular to the central axis of the hoisting lug 5, so that the extending-out portion can retract into the through hole. The cross section of the hoisting lug 5 can be oval, rectangular, triangular, etc. In this embodiment, the cross section of the hoisting lug 5 is circular, and a diameter of the main body portion is greater than a diameter of the extending-out portion, and a diameter of the out ring of the bearing 4 is not greater than the diameter of the main body portion.

As another embodiment, the tower section further includes an end cover 1, which is connected to an end of the extending-out portion away from an end of the main body portion, so that the end cover 1 closely covers the through hole in the case that the extending-out portion of the hoisting lug 5 retracts into the through hole, so as to prevent external salt mist and water vapor from entering the tower during the operation of the wind generating set. In addition, the end cover 1 can limit the sling 15 during the hoisting process of the tower section, so as to prevent the sling 15 from falling off from the hoisting lug 5, thereby further improving the safety of the operation. Specifically, a cross section of the end cover 1 in the direction perpendicular to the central axis of the hoisting lug 5 is rectangular, elliptical or triangular. Preferably, the cross section of the end cover 1 is circular, and a diameter of the cross section of the end cover 1 is greater than the diameter of the main body portion of the hoisting lug 5. More preferably, an arc concave chamber is formed at an end of the end cover 1 facing the hoisting lug 5, so that the end cover 1 closely abuts against an outer circumferential surface of the tower section.

The end cover 1 is arranged on an end surface of the extending-out portion by a fastener 2. For example but not limited to, a mounting through hole for the fastener 2 to pass through is provided in the end cover 1, a threaded hole 17 which is matched with an external thread of the fastener 2 is provided on the end surface of the extending-out portion of the hoisting lug 5, and the end cover 1 is fixed to the hoisting lug 5 by inserting the fastener 2 into the mounting through hole and screwing it into the threaded hole 17.

Figure 3:
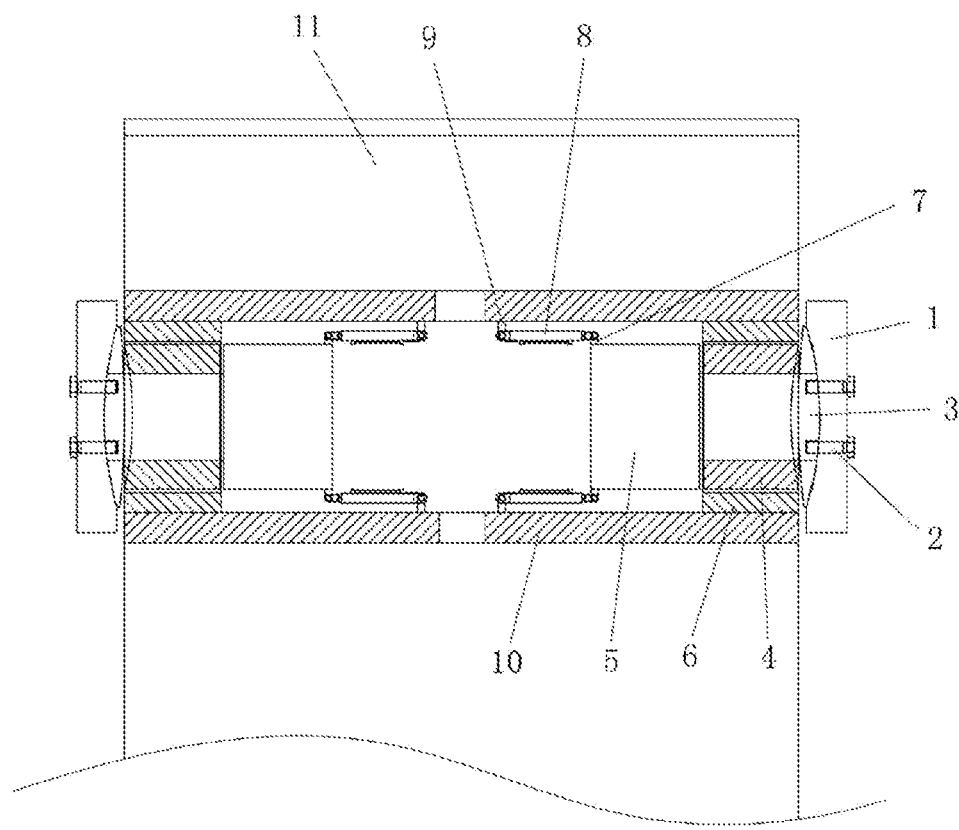
FIG. 3 is a partial enlarged view of the tower section in FIG. 2 in a case that a hoisting lug retracts into a through hole.
Figure 4:
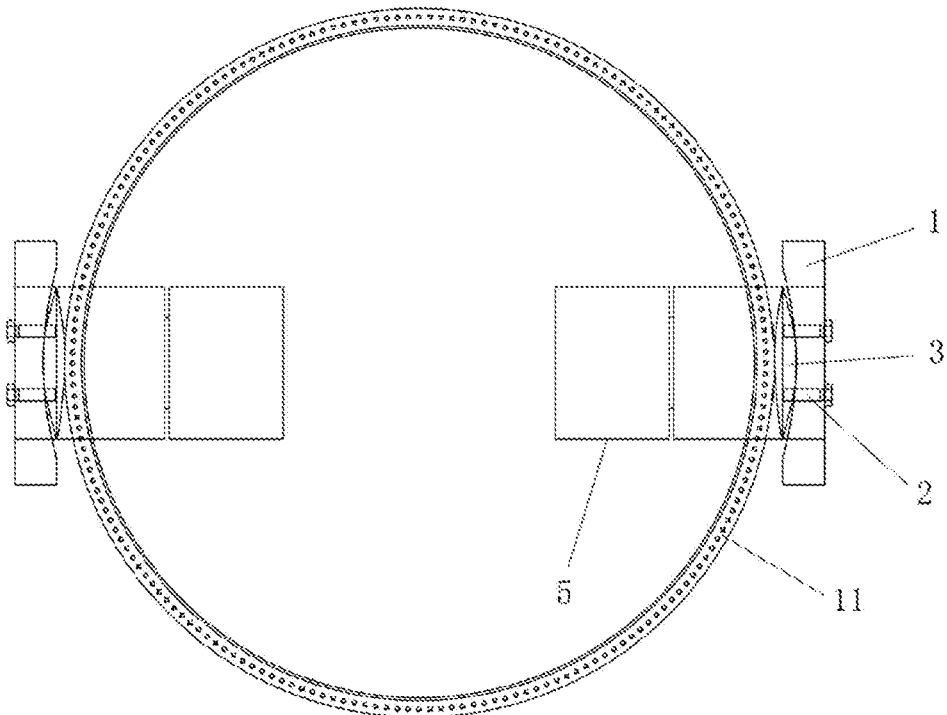
FIG. 4 is a structural view showing a state before an end cover of the tower section abuts against the tower section body in FIG. 1.
Figure 5:
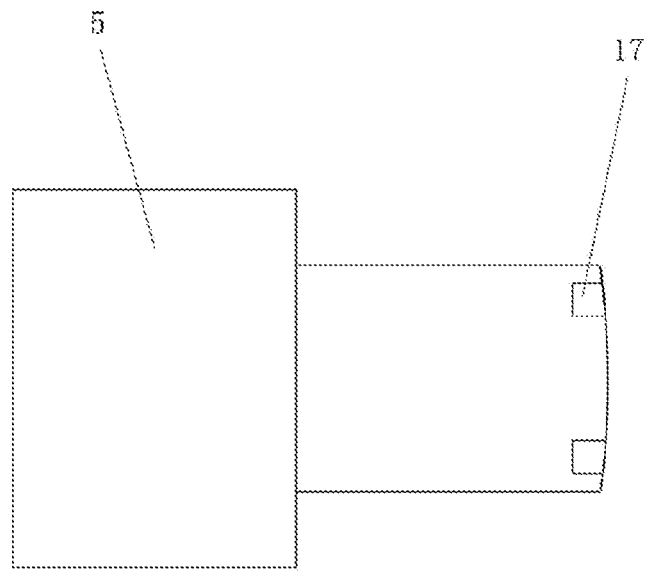
FIG. 5 is a structural view of the hoisting lug in FIG. 1.
Figure 6:
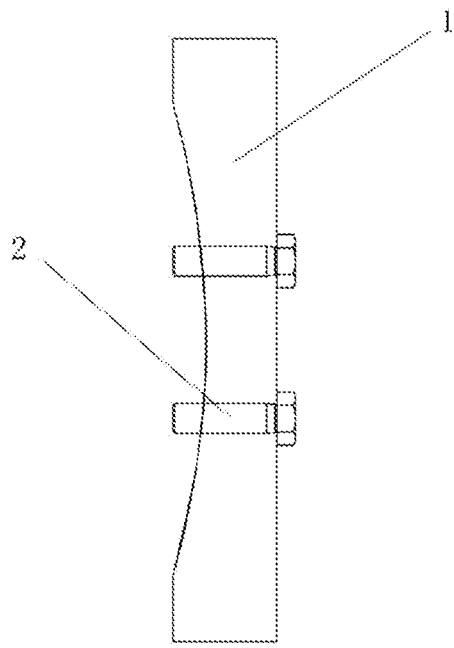
FIG. 6 is a structural view of the end cover in FIG. 1.
Figure 7:
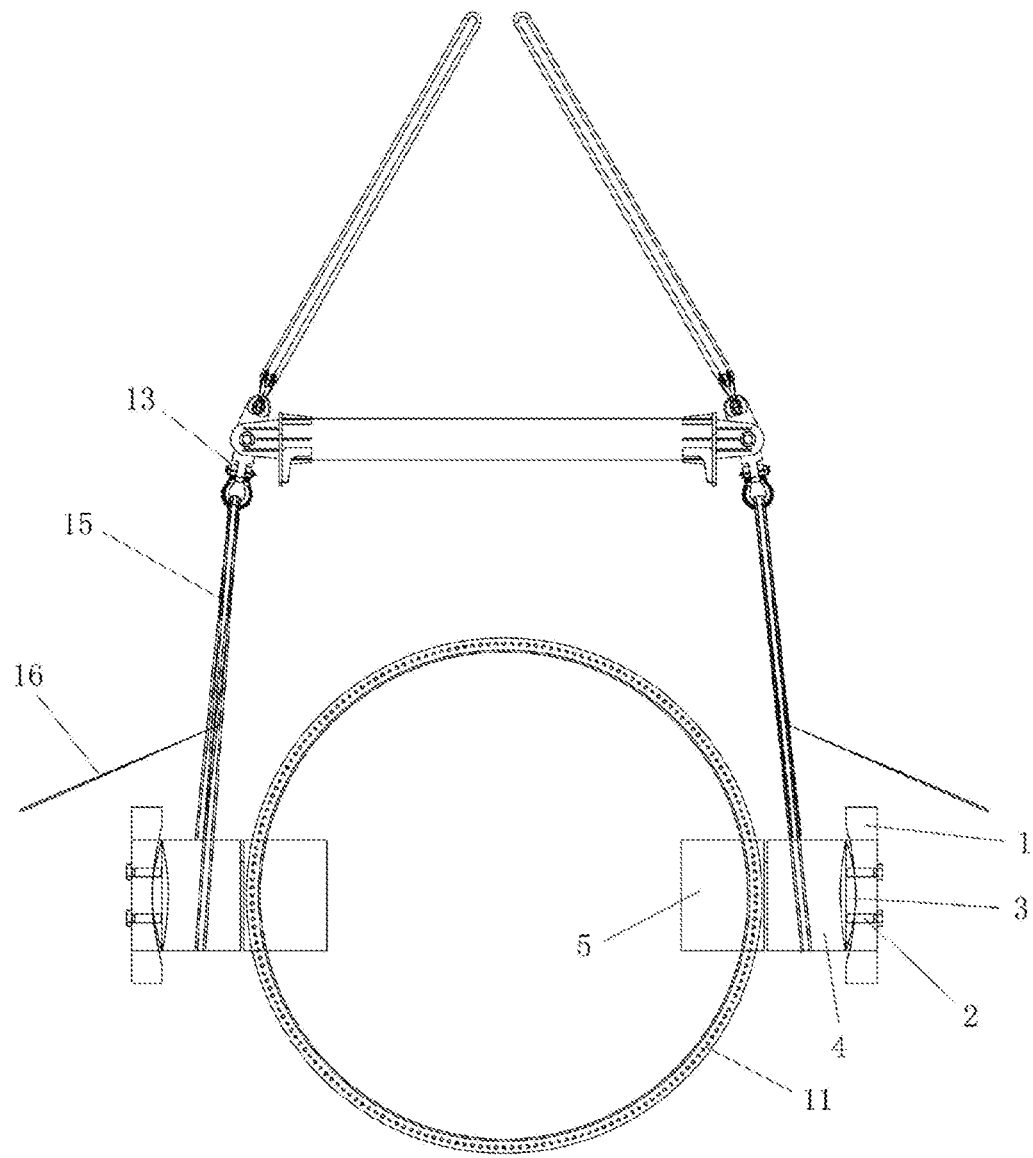
FIG. 7 is a structural view of the tower section in another hoisting state in FIG. 1.

Referring to the figures, a sealing member 3 is provided between the end cover 1 and the hoisting lug 5, and the sealing member 3 can retract into the through hole for sealing in the case that the extending-out portion of the hoisting lug 5 retracts into the through hole, or the sealing member 3 closes abuts against an outer circumference of the through hole, which further improves the sealing performance of the tower section. Referring to FIG. 3, in this embodiment, a cross section of the sealing member 3 in the direction perpendicular to the center axis of the hoisting lug 5 may be circular, and a diameter of the sealing member 3 can be greater than a diameter of the through hole. Furthermore, the sealing member 3 can be arranged to taper from the center to an edge, so as to facilitate sealing. In actual, a sealing member mounting hole, which is matched with the threaded hole 17, is provided on the sealing member 3 for the fastener 2 to pass through.

Preferably, the tower section is cylindrical, the central axis of the hoisting lug 5 extends along a radial direction of the tower section, and at least two hoisting lugs 5 are spaced apart at a predetermined angle along a circumferential direction of the tower section, that is, two hoisting lugs 5 are provided in this embodiment and both extend along a diameter of the tower section. It can be understood that three hoisting lugs 5 can be provided and be equally spaced apart at an angle of 120 degrees on a same circumference of the tower section body 11. Certainly, four hoisting lugs 5 may be provided and be equally spaced apart at an angle of 90 degrees on a same circumference of the tower section body 11, and so on, which will not be repeated herein.

More preferably, at least two hoisting lugs 5 are provided along an axial direction of the tower section body 11, so as to horizontally hoist the tower section. Specifically, referring to FIG. 1, two sets of hoisting lugs 5 are provided along the axial direction of the tower section body 11, for example, the hoisting lugs 5 on the left side in FIG. 1 are referred to as the left hoisting lugs, and the hoisting lugs 5 on the right side in FIG. 1 are referred as the right hoisting lugs. Two left hoisting lugs and two right hoisting lugs are respectively provided, and are spaced apart at an angle of 180 degrees along a circumferential direction of the tower section body 11, and a line segment formed by the position at which one left hoisting lug is and the position at which one right hoisting lug is parallel to an central axis of the tower section body 11. During the horizontal hoisting process of the tower section, the sling 15 can be connected to both one left hoisting lug and one right hoisting lug which are located on the straight line segment, respectively. Of course, it can be understood that the other sling 15 is also connected to both the other left hoisting lug and the other right hoisting lug, so that the tower section can be hoisted horizontally. Referring to the figure, furthermore, the tower section further includes a supporting platform 10, which is fixed to the inner cavity of the tower section body 11, and a guiding member 6, which is coaxially arranged with the through hole, where the guiding member 6 is fixed to the supporting platform 10, and the hoisting lug 5 can be connected to the tower section body 11 through the guiding member 6. Specifically, the guiding member 6 is sleeved into the through hole, and an end of the guiding member 6 facing the end cover 1 is matched with an outer circumference of the tower section.

A guiding groove is provided in one of an inner wall of the guiding member 6 and an outer circumference of the hoisting lug 5, a sliding block, which is matched with the guiding groove, is provided in the other one of the inner wall of the guiding member 6 and the outer circumference of the hoisting lug, and the sliding block is slidable in the guiding groove. In addition, an extending direction of the guiding groove is substantially parallel to the central axis of the hoisting lug 5. In this embodiment, the inner wall of the guiding member 6 is recessed to form the guiding groove, the outer circumference of the hoisting lug 5 is protruded to form the sliding block, and the hoisting lug 5 is movable along a direction of a centerline of the through hole by sliding the sliding block in the guiding groove. The guiding member 6 can also be fixed on the tower section body 11 by means of other structures.

The supporting platform 10 provided in this embodiment may be a supporting platform which has been provided in the tower section for operation and maintenance personnel, so that the number of supporting platforms can be decreased, the material consumption of the entire tower section can be reduced, and the manufacturing cost can be reduced. The supporting platform 10 may also be the supporting platform which is mounted for cooperating with the hoisting lug 5. Preferably, the supporting platform 10 may be in a frame structure in order to reduce the weight of the tower section.

Referring to the figure, the driving member may be a hydraulic cylinder, an air cylinder or other electric pushing rods, and the driving member being a hydraulic cylinder is taken as an example in this embodiment. A first mounting seat 7 is provided at the end of the main body portion of the hoisting lug 5, a second mounting seat 9 is fixed to the supporting platform 10, and two ends of the hydraulic cylinder are hinged to the first mounting seat 7 and the second mounting seat 9 respectively. Specifically, a cylinder body 8 of the hydraulic cylinder is connected to the supporting platform 10, a cylinder rod 12 of the hydraulic cylinder is connected to the main body portion of the hoisting lug 5, to drive the hoisting lug 5 to move in the through hole by the relative sliding movement of the cylinder rod 12 within the cylinder body 8, so that the extending-out portion can selectively extend out of the tower section for hoisting.

Figure 2:
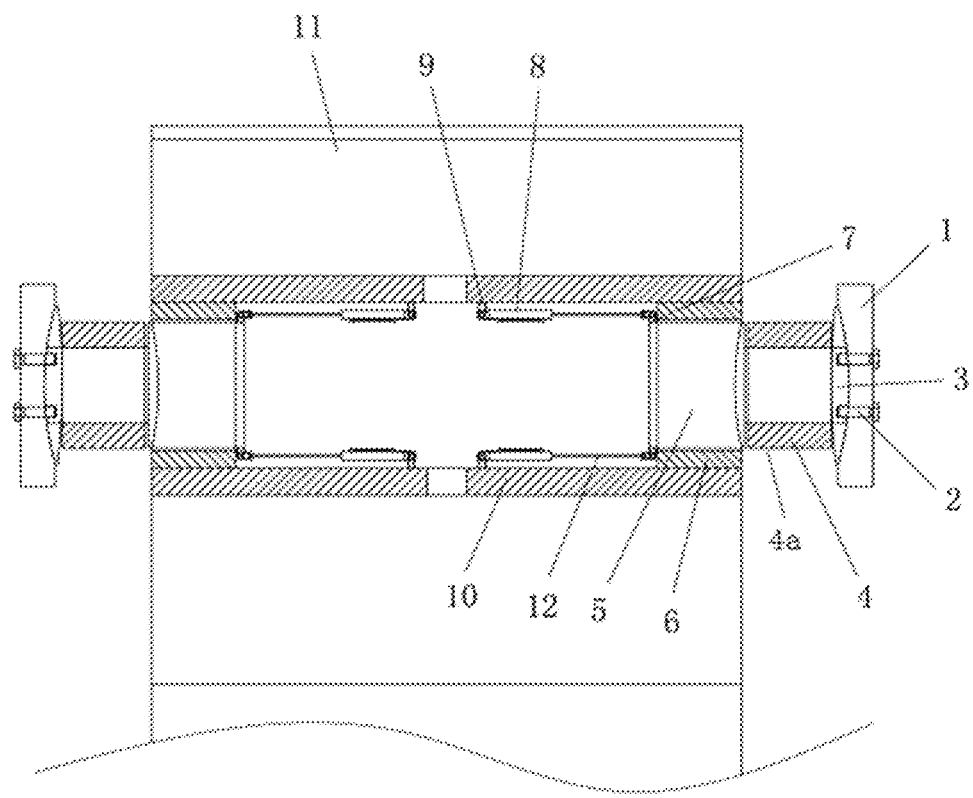
FIG. 2 is an enlarged view of the tower section in FIG. 1.

According to another exemplary embodiment of the present disclosure, a limiting block is formed at an end of the main body portion away from the extending-out portion, and the limiting block is formed by protruding outward from an outer circumference of the main body portion, so as to be capable of being clamped at an end of the guiding member 6. One, two or more limiting blocks may be provided to be circumferentially arranged on a same circumference of the main body portion, so as to limit the movement of the hoisting lug 5, preventing the hoisting lug 5 from falling off from the through hole and improve the safety of the tower section. The first mounting seat 7 may be provided on the limiting block, as shown in FIG. 2 and FIG. 3. Two limiting blocks may be provided as needed, and be uniformly arranged on the circumference of the main body portion.

As another embodiment, the tower section further includes a spring locking pin (not shown) which is pre-embedded in one of the outer circumference of the main body portion and an inner cavity of the guiding member 6, a groove (not shown) which is matched with the spring locking pin is provided in the other one of the outer circumference of the main body portion and the inner cavity of the guiding member 6, and the spring locking pin is selectively fixed in the groove. During the movement of the hoisting lug 5 along the direction of the centerline of the through hole, a pin of the spring locking pin can be fixed in the groove under the elastic force of the spring in a case that the spring locking pin matches a position of the groove, so as to lock the hoisting lug 5 for hoisting. After the hoisting is completed, the driving member can reversely drive the spring locking pin to move as the hoisting lug 5 is required to retract into the through hole, so that the spring locking pin is separated from the groove, thereby unlocking.

During the inverted transportation of the tower section, a crane is connected to the hoisting lugs 5 on two sides of the tower section through two slings 15, which can be directly hooked, unloaded and transported invertedly, and realize the non-vertical hoisting of the slings 15, such as but not limited to the inverted-V shaped hoisting, so that the center of gravity of the tower is biased to one side to reduce the risk of hoisting.

During the hoisting of the tower section, the turnover of the tower section can be realized with the help of a hoisting beam assembly 13. Specifically, one end of the sling 15 is connected with the hoisting beam assembly 13, and the other end is sleeved on the outer circumference of the bearing 4 of the extending-out portion of the hoisting lug 5, which can realize the transformation between the vertical state and the horizontal state of the tower section. After the tower section is changed into the vertical state from the horizontal state and is connected to a lower tower section, the hook is slowly released, and the sling 15 is in a loose state, and the automatic decoupling action of the sling can be realized by pulling outward with a wind cable 16.

At present, in order to hoist different types of tower sections, multiple hoisting points need to be provided on the hoisting beam to keep the sling extending vertically in the hoisting process of the tower section, so as to prevent the interference between the sling and the tower section. Since the tower section provided according to the present disclosure has hoisting lugs 5 that can extend outward, there is no interference between the sling and the tower section during the hoisting of the tower section, and the non-vertical hoisting of the sling can be realized. For example but not limited to, the sling can be hoisted in an inverted-V shape. In addition, due to the existence of the hoisting lug 5, there is no need to match the special hoisting tool to connect with the flange bolt of the tower section, which solves the problem that the tower hoisting tool is not universal, thus reducing the cost, simplifying the mounting process of the hoist, and improving the work efficiency. The hoisting lug 5 is arranged to selectively extend out of the tower section, which can realize the simple transition between hoisting conditions and non-hoisting conditions, with simple structure and easy operation.

Furthermore, the bearing 4 is sleeved on the extending-out portion of the hoisting lug 5, which can avoid the friction damage of the hoisting lug 5 to the sling during the hoisting, so as to improve the service life of the sling and further improve the safety of the tower section.

Since the sealing member 3 can cover the outer circumference of the through hole, or cover an outer circumference of the through hole of the guiding member 6, the inner cavity of the tower section can be isolated from the exterior in the case that the hoisting lug 5 retracts into the through hole, which can prevent the external salt mist or wet gas from entering the tower section, and improve the sealing performance and safety of the tower section.

In addition, the described characteristics, structures, or features according to the present application may be combined in one or more embodiments in any appropriate manner. In the above descriptions, a lot of specific details are provided to give a comprehensive understanding of the embodiments of the present application. However, a person of ordinary skill in the art is to be aware that, the technical solutions in the present application may be implemented without one or more of the particular details, or another method, component, or material may be used. In other cases, well-known structures, materials, or operations are not shown or described in detail, in order not to obscure the aspects of the present application.

The invention claimed is:

1. A tower section, comprising:
a tower section body, wherein through holes are provided in a side wall of the tower section body; and
at least two hoisting lugs, wherein the at least two hoisting lugs, corresponding to the through holes, are provided on the tower section body, and are movable between a first position extending out of the tower section body and a second position retracting into the tower section body to hoist the tower section,
wherein each hoisting lug comprises a main body portion, which is located in the tower section body, and an extending-out portion, which extends out of the tower section body when the each hoisting lug is located at the first position, a bearing is sleeved on an outer circumference of the extending-out portion;
wherein an outer ring of the bearing is rotatable around a central axis of each hoisting lug, and a sling is sleeved on the outer ring of the bearing during hoisting of the tower section.

2. The tower section according to claim 1, wherein each hoisting lug has a stepped shaft structure, and a diameter of the main body portion is greater than a diameter of the extending-out portion.

3. The tower section according to claim 2, wherein each hoisting lug further comprises an end cover that is connected to the extending-out portion, wherein a projection of the end cover in a direction perpendicular to a central axis of the hoisting lug extends outward from a projection of the bearing in the direction perpendicular to the central axis of the hoisting lug.

4. The tower section according to claim 3, wherein a sealing member is provided between the end cover and the extending-out portion.

5. The tower section according to claim 1, wherein the tower section body is cylindrical, the at least two hoisting lugs are spaced apart at a predetermined angle along a circumferential direction of the tower section body.

6. The tower section according to claim 1, wherein at least two hoisting lugs are provided along an axial direction of the tower section body, and at least two hoisting lugs are provided along a circumferential direction of the tower section body at which each hoisting lug is located.

7. The tower section according to claim 1, wherein the tower section further comprises a guiding member, which is fixed to the tower section body, and the main body portion is movable along the guiding member.

8. The tower section according to claim 7, wherein a limiting block is formed at an end of the main body portion away from the extending-out portion.

9. The tower section according to claim 7, wherein the tower section further comprises a spring locking pin, which is pre-embedded in one of an outer circumference of the main body portion and an inner cavity of the guiding member, wherein a groove, which is matched with the spring locking pin, is provided in the other one of the outer circumference of the main body portion and the inner cavity of the guiding member, and the spring locking pin is selectively fixed in the groove.

10. The tower section according to claim 7, wherein the tower section further comprises a supporting platform, which is fixed to an inner chamber of the tower section, and a driving member for the movement of each hoisting lug, wherein the guiding member is fixed to the supporting platform.

11. A wind generating set, wherein the wind generating set comprises the tower section according to claim 1.

12. The wind generating set according to claim 11, wherein each hoisting lug has a stepped shaft structure, and a diameter of the main body portion is greater than a diameter of the extending-out portion.

13. The wind generating set according to claim 12, wherein each hoisting lug further comprises an end cover that is connected to the extending-out portion, wherein a projection of the end cover in a direction perpendicular to a central axis of the hoisting lug extends outward from a projection of the bearing in the direction perpendicular to the central axis of the hoisting lug.

14. The wind generating set according to claim 13, wherein a sealing member is provided between the end cover and the extending-out portion.

15. The wind generating set according to claim 11, wherein the tower section body is cylindrical, the at least two hoisting lugs are spaced apart at a predetermined angle along a circumferential direction of the tower section body.

16. The wind generating set according to claim 11, wherein at least two hoisting lugs are provided along an axial direction of the tower section body, and at least two hoisting lugs are provided along a circumferential direction of the tower section body at which each hoisting lug is located.

17. The wind generating set according to claim 11, wherein the tower section further comprises a guiding member, which is fixed to the tower section body, and the main body portion is movable along the guiding member.

18. The wind generating set according to claim 17, wherein a limiting block is formed at an end of the main body portion away from the extending-out portion.

* * * * *